Feb. 2, 1932. V. G. APPLE 1,843,589
DYNAMO ELECTRIC MACHINE ELEMENT
Filed June 14, 1928 3 Sheets-Sheet 1
Fig 1
Fig 2
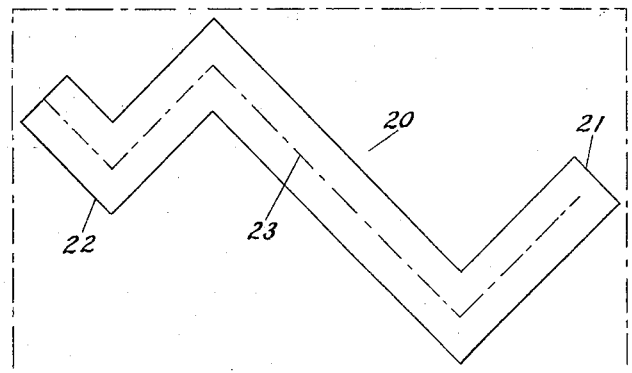
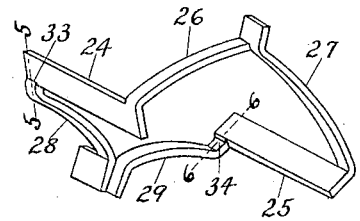
Fig 3
Fig 4
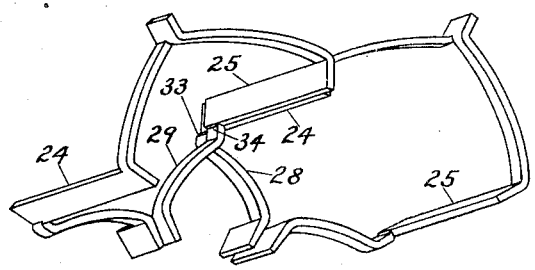
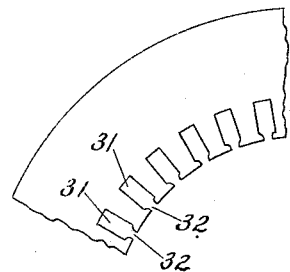
Fig 5
Fig 6
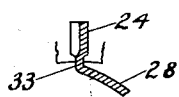
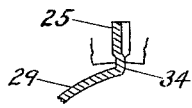
INVENTOR.
Vincent G. Apple Patented Feb. 2, 1932

1,843,589

UNITED STATES PATENT OFFICE

VINCENT G. APPLE, OF DAYTON, OHIO

DYNAMO ELECTRIC MACHINE ELEMENT

Application filed June 14, 1928. Serial No. 285,362.

My invention relates to improvements in windings of dynamo electric machine elements wherein a plurality of loops, each being open at one end, are assembled with a core and connected in series to form a continuous circuit; and some of the objects of my improvements are, first, to provide a construction wherein conductors of maximum size for a given core slot may be used; second, to so form the loops that they may be entered thru partially closed core slots; third, to so form the loops that they may be economically cut from sheet stock with minimum waste; fourth, to form each loop complete prior to assembly with a core so that no bending of the loop is afterward required; fifth, to so form the loops that the ends thereof may be joined to provide a commutator; sixth, to provide a winding which may not be radially removed from the core but which may in its entirety be endwise entered or removed therefrom at will.

Other objects will become apparent to those skilled in the art as the invention is described in detail and reference is made to the drawings wherein—

Fig. 1 is an outline of a sheet metal blank from which the loops comprising my winding may be made.

Fig. 2 is a view in perspective of a loop formed by properly bending the blank Fig. 1.

Fig. 3 is a view in perspective of two loops Fig. 2 placed in the same relation to each other as they occupy in a completed winding.

Fig. 4 is an outline of several slots of a core to which a winding composed of loops Fig. 2 is particularly applicable.

Fig. 5 is a cross section taken on line 5—5 of Fig. 2 as it would appear in one of the core slots of Fig. 4.

Fig. 6 is a cross section taken on line 6—6 of Fig. 2 as it would appear in one of the core slots of Fig. 4.

Similar numerals refer to similar parts throughout the several views.

Figure 7:
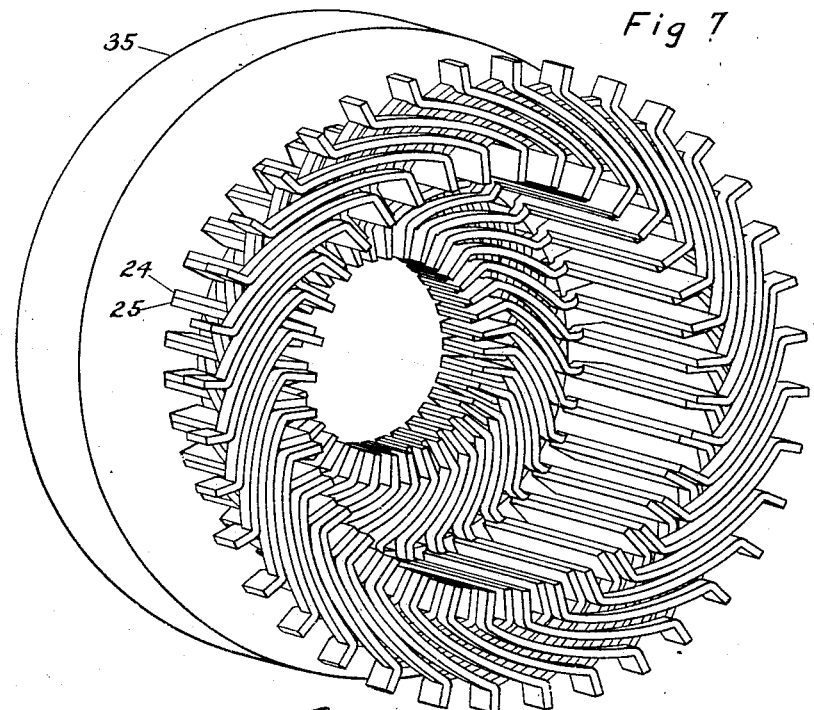
Fig. 7 is a perspective view of a core about which a plurality of loops Fig. 2 are assembled in cylindrical formation, the ends of the loops being slightly entered into the core slots.

In winding a dynamo electric machine element of that type having a core with partially closed slots the present practice consists of forming each loop of the winding to a U shape; stacking a plurality of such U shaped loops in cylindrical formation; endwise entering them thru the core slots until the free ends project therebeyond then bending and joining the projecting ends in appropriate pairs to form a continuous circuit thru the winding. As it is one object of my present invention to complete the loops composing my winding prior to their entry into the core slots, I proceed as shown in Fig. 1 where a blank 20 having an upwardly extending portion 21 and a downwardly extending portion 22 has been cut from sheet stock. (Blanks as here shown when taken with their length somewhat diagonally across the width of a sheet of stock may be cut, one following the other, throughout the length of the sheet with very little waste.) The broken line 23 indicates where the blank 20 may be slit before or at the time of bending to loop form.

In Fig. 2 I show a completed loop after it has been slit on the broken line 23 and bent so that it comprises a conductor bar 24, a conductor bar 25, two joined upwardly extending connecting ends 26 and 27 and two separated downwardly extending connecting ends 28 and 29.

In Fig. 3 I show two of the loops Fig. 2, placed in the relative position to each other that they occupy in a completed winding, a bar 24 of one loop and a bar 25 of the other loop being adapted to occupy circumferentially adjacent positions in the same core slot, and in Fig. 4 I show in outline several core slots into which pairs comprising bars 24 and 25 may be endwise entered, the core slots shown, commonly known as partially closed core slots, having the usual wide portions 31 and narrower openings 32.

Bars 24 and 25, paired as in Fig. 3 may be readily endwise entered thru the wider portions 31 of the slots, and ends 28 and 29 occupying longitudinally different positions will follow one after the other thru the narrow opening if they are offset as at 33 and 34, Figs. 2 and 3.

Fig. 5 shows a cross-section of a bar 24 and an end 28 at the offset portion 33 as it would appear passing thru a core slot and Fig. 6 shows a cross section of a bar 25 and an end 29 at the offset portion 34 as it would appear passing thru another one of the core slots, the offsets 33 and 34 causing the ends to extend from the middle portions of the bars so that they may follow one after the other thru the narrow opening 32 while the bars pass side by side thru the wider portion 31.

In the foregoing I have shown and described a method of making a loop for my improved winding, which includes cutting same from sheet stock, but it is obvious that other methods of making this or similar loops may be employed, and for relatively large elements the loops may be forged or cast to the form shown, or the loops may be of modified form, having conducting bars of round, oval, or other cross-section arranged circumferentially adjacent, or one radially above another in corresponding core slots, or if desired more than two conductors may occupy the same slot or a separate slot may be provided for each conductor of the winding, an important feature of the invention residing in the combination in a dynamo electric machine element of a core having partially closed slots, conductor bars contained therein of a size and form which may be entered endwise only therethrough and consequently may not be radially removed therefrom, the connecting ends extending from one end of the conductor bars being of such cross section and extending from the bars in such direction as will pass endwise thru the narrow or open part of the slots when the bars are passed endwise thru the wider portion of the slots. The connecting ends at either end of the loops may be of the form shown or they may be of any other form which will connect the spaced apart bars of the winding without interference one connecting end with another, and while in the drawings the separated downwardly extending ends 28 and 29 are bent in directions relative to the loop to compose a turn of a lap winding, it is obvious that by bending these ends, each oppositely to the direction shown, a turn of a wave winding may be produced.

A winding consisting of a plurality of loops of the character described is not readily assembled with a core one loop at a time and I therefore proceed as in Fig. 7 where an entire winding composed of loops Fig. 2 is stacked in cylindrical formation with the ends of the loops slightly entered in the slots of a core 35. After the loops are stacked in relation to the core, as shown, they may be simultaneously endwise entered into the core slots, bars 24 and 25 forming pairs which pass side by side thru the wider portion 31 of the slots and ends 28 and 29 forming pairs which pass one following the other thru the narrower opening 32.

Figure 8:
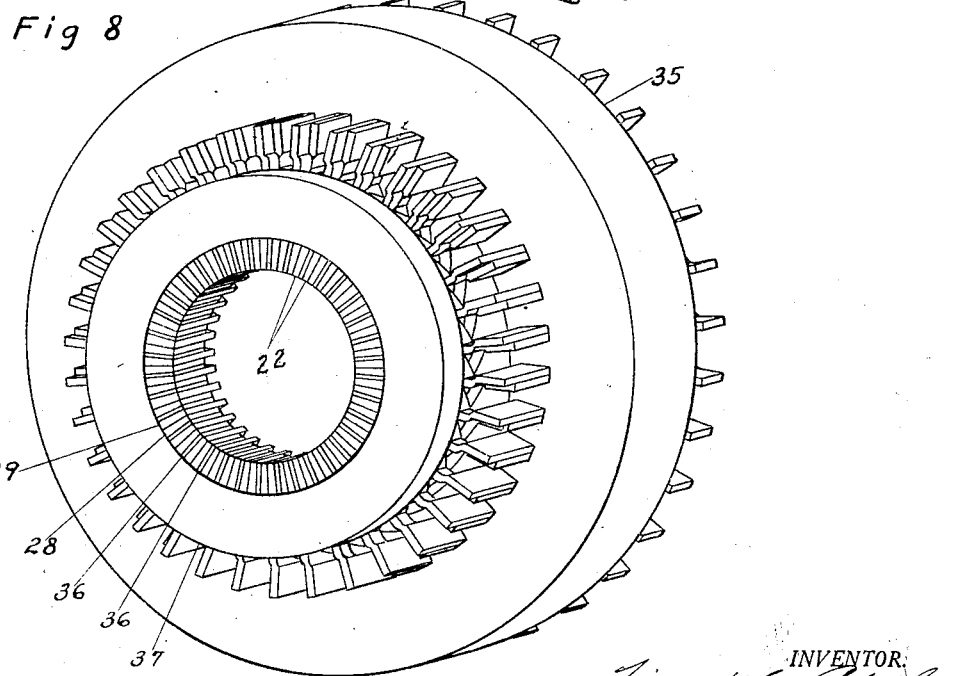
Fig. 8 is a perspective view of a complete element after the loops have been endwise entered thru the core slots and a means provided to bind the ends of the loops together in continuous circuit.

When the loops have been thus assembled with the core 35 a means of connecting the ends 28 of the loops to the ends 29 of consecutive loops must be provided and while they may be brought together and soldered, brazed, welded or otherwise joined, I prefer that they be joined as shown in Fig. 8 where the winding is so proportioned that these ends come close together and when the ends are bent for a lap winding, as shown, it is required only to place strips of insulating material, as at 36, 36 etc., between each end 28 and 29 of the same loop after which contact between successive loops of the circuit may be had by binding all of the ends together. Any suitable binding means may be employed, a simple form consisting of a ring of insulating material encircling the ends as at 37. Better contact between successive loops of the circuit may be had if the ends at 22 are struck flatwise in a die to bring them to a slightly wedge shaped cross section, such striking operation being preferably done at the time the loop is being formed. The exposed ends 22 of the loops may be used as a brush track when desired to commutate current from the winding when it forms part of a direct current machine, or, when the winding is used in alternating current machines having a revolving field, revolving brushes carried by said field may bear on the ends 20 to supply direct current to energize the revolving field coils.

Figure 9:
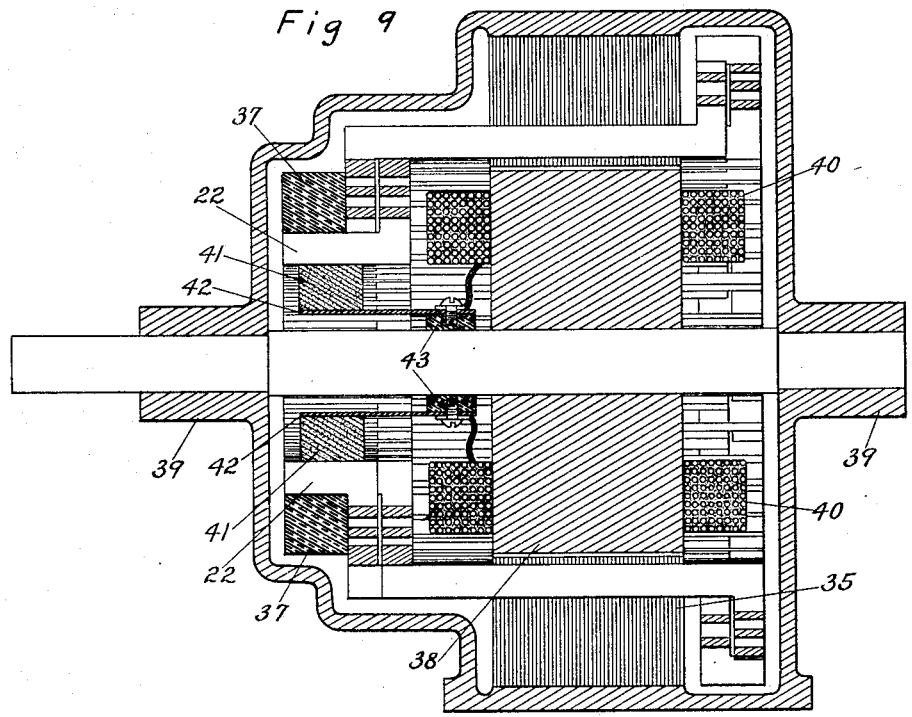
Fig. 9 is a longitudinal cross section thru a dynamo electric machine having a stator such as I show in Fig. 8.
Figure 10:
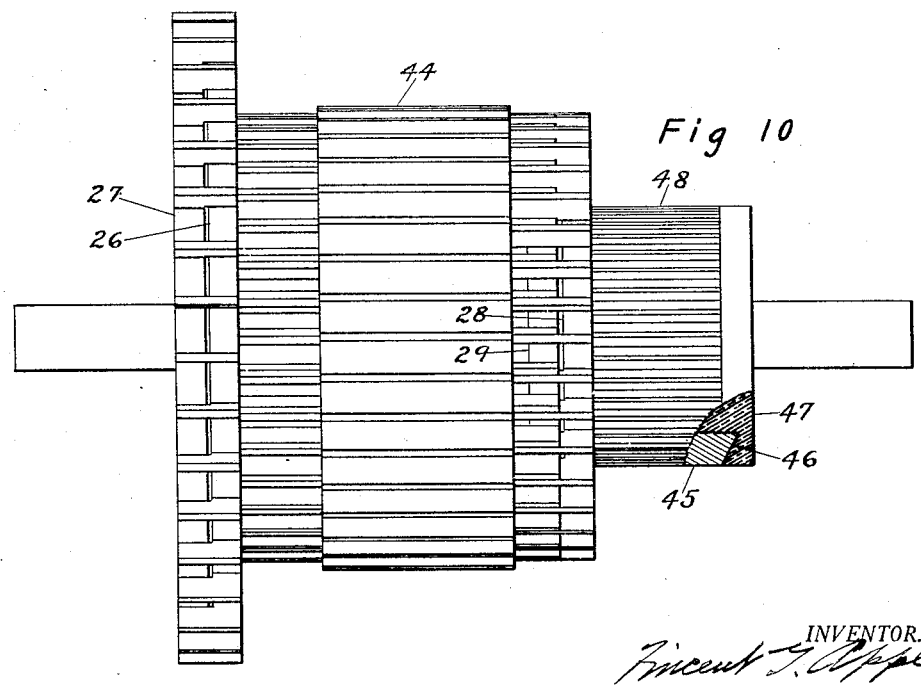
Fig. 10 is a view of an element embodying my improved winding in another form.

A cross section thru a machine of this character is shown in Fig. 9 where a stator, constructed substantially as shown in Fig. 8, surrounds a revolving field element 38 which is supported in bearings 39. Coils 40 connected to brushes 41 revolve with the field element and the brushes 41 bearing on the bound together ends 22 of the stator winding supply rectified current to the coils 40. Flexible means 42 mounted on insulation 43 maintains the brush contact. When the loops of my winding are made as hereinbefore shown they are particularly applicable to elements having hollow cores with slots at their inner diameters, as indicated, but by slightly modifying the loops by making the offsets 33 and 34 Figs. 2 and 3, in the joined ends 26 and 27 instead of in the separated ends 28 and 29, as shown, these loops may with equal facility be applied to a core having teeth at its outer diameter. In Fig. 10 the core 44 has assembled therewith a winding of which the outwardly extending integral connecting portions 26 and 27 carry the offsets 33 and 34 so that this end of the winding passes thru the slots at assembly. These outwardly extending ends provide in effect a suitable fan to keep the parts cool in operation. The inwardly extending separated ends 28 and 29 may be extended at 45 to any length desired, beveled as at 46 and bound together by molded insulating as at 47 or by any means desired to provide a commutator having a brush track at 48, or these ends may be so bound together that a brush track will be provided on the inner diameter or ends of the commutator. An element as shown in Fig. 10 may be used as a direct current armature, or by adding collecting rings thru which alternating current may be transmitted the commutating end may be used to supply rectified current to the coils of a stationary field.

While in the foregoing I have described a procedure in which the separate loops of the winding are first entered into the core and afterward joined in continuous circuit, it may in some cases be advantageous to assemble and join the entire winding separately, after which it may be endwise entered or removed from the core at will.

Variation in the form and arrangement of the ends of the loops may be made to provide lap or wave connections in series or series parallel circuits, as desired.

Such other variations in the details, methods, and uses of my invention as do not depart from the spirit thereof I aim to cover in the following wherein—

I claim:

1. In a dynamo electric machine element, an integral winding unit comprising, a loop having two parallel spaced apart bars and integral end turns closed at the one end of the loop and open at the other, the end turns at one end of the loop extending at right angles from the edges of the bars away from the axis of the element, and at the other end at the right angles from the edges of the bars toward the axis of the element.

2. In a dynamo electric machine element, an integral winding unit comprising a loop having two parallel spaced apart bars and integral end turns closed at the one end of the loop and open at the other, the end turns at the closed end of the loop extending at right angles from the edges of the bars away from the axis of the element and at the open end at right angles from the edges of the bars toward the axis of the element.

3. In a dynamo electric machine element, an integral winding unit comprising a loop having two parallel spaced apart bars and integral end turns of involute form closed at the one end of the loop and open at the other, the end turns at one end of the loop extending at right angles from the edges of the bars away from the axis of the element and at the other end at right angles from the edges of the bars toward the axis of the element.

4. In a dynamo electric machine element, an integral winding unit comprising, a loop having integral end turns closed at the one end of the loop and open at the other, the integral end turns at the open end terminating in commutator segments, the end turns at one end of the loop extending away from the axis of the element, and at the other end toward the axis of the element.

5. In a dynamo electric machine element, an integral winding unit comprising, a loop having integral end turns closed at the one end of the loop and open at the other, the integral end turns at the open end terminating in commutator segments, the end turns at the open end extending toward the axis of the element and at the closed end away from the axis of the element.

6. In a dynamo electric machine element, an integral winding unit comprising, two parallel angularly spaced apart bars, end turns extending at right angles from the edges of said bars away from the axis of the element at one end, and toward it at the other, said end turns being joined together at the one end and slightly spaced apart at the other.

7. In a dynamo electric machine element, an integral winding unit comprising, a pair of parallel angularly spaced apart conductor bars, end turns at one end of said pair extending at right angles from the edges of the bars outwardly away from the axis of the element, and at the other end of said pair at right angles from the edges of the bars inwardly toward the axis of the element, said outwardly extending end turns being joined together and said inwardly extending end turns being angularly spaced apart.

8. In a dynamo electric machine element, an integral winding unit comprising, a pair of parallel angularly spaced apart conductor bars, end connectors at one end of said pair extending from the outer edges of the bars outwardly away from the axis of the element, and at the other end of said pair inwardly toward the axis of the element, said end turns at one end of the pair being joined together and at the other end being spaced apart and terminating in commutator segments.

9. In a dynamo electric machine elements having a core with winding apertures partly closed at their outer edges, an integral winding unit comprising, a pair of parallel angularly spaced apart conductor bars, end connectors at one end of said pair extending from the edges of the bars outwardly away from the axis of the core, and at the other end of said pair inwardly toward the axis of the core, said connectors at one end joining the bars together and at the other end leaving them spaced apart, and said end connectors at one end being of such form and cross-section where they join the edges of the bars as may be endwise moved through the partly closed outer edges of the said winding apertures.

10. In a dynamo electric machine structure, a cylindrical core having a plurality of winding slots, two conductor bars side by side in each slot and situated substantially at the bottoms of said slots, said slots being deeper than the width of said bars and restricted at the tops above said bars to substantially the thickness of one of said bars, and integral end connectors at one end of the structure extending from those edges of said bars which are toward the tops of the slots, said end connectors being offset sidewise where they join said bars an amount equal to substantially half the thickness of one of said bars.

11. A structure such as is defined in claim 10, but having integral end connectors also at the other end of the structure extending in the opposite direction and from the opposite edges of the bars.

12. A structure such as is defined in claim 10, but having integral end connectors also at the other end of the structure extending in the opposite direction and from the opposite edges of the bars, and having the pairs of end connectors at one end of the structure joined together, and at the other end slightly spaced apart.

13. A structure such as is defined in claim 10, but having integral end connectors also at the other end of the structure extending in the opposite direction and from the opposite edges of the bars, and having the pairs of end connectors at one end of the structure joined together, and at the other end slightly spaced apart, and having integral commutator segments extending lengthwise of the bars from the ends of the spaced apart connectors.

14. A structure such as is defined in claim 10, but having integral end connectors also at the other end of the structure extending in the opposite direction and from the opposite edges of the bars, and having the pairs of end connectors at one end of the structure joined together, and at the other end slightly spaced apart, and having integral commutator segments extending lengthwise of the bars from the ends of the spaced apart connectors, with a ring of insulation extending between and about the end connectors at one end of the structure and around the commutator segments to compose a commutator therefrom.

In testimony whereof I hereunto set my hand.

VINCENT G. APPLE.